(12) United States Patent
Sakai

(10) Patent No.: US 11,496,535 B2
(45) Date of Patent: Nov. 8, 2022

(54) VIDEO DATA TRANSMISSION APPARATUS, VIDEO DATA TRANSMITTING METHOD, AND STORAGE MEDIUM

(71) Applicant: CANON KABUSHIKI KAISHA, Tokyo (JP)

(72) Inventor: Tomohiro Sakai, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 378 days.

(21) Appl. No.: 16/522,099

(22) Filed: Jul. 25, 2019

(65) Prior Publication Data
US 2020/0045096 A1 Feb. 6, 2020

(30) Foreign Application Priority Data

Aug. 2, 2018 (JP) .............................. JP2018-145650

(51) Int. Cl.
*G06F 15/16* (2006.01)
*H04L 65/70* (2022.01)
*H04L 65/61* (2022.01)

(52) U.S. Cl.
CPC .............. *H04L 65/70* (2022.05); *H04L 65/61* (2022.05)

(58) Field of Classification Search
CPC . H04L 65/607; H04L 65/608; H04L 65/4069; H04L 65/4084
USPC ................................ 709/203, 219–220, 224
See application file for complete search history.

(56) References Cited

U.S. PATENT DOCUMENTS

| | | | | |
|---|---|---|---|---|
| 2002/0106190 A1* | 8/2002 | Nygren | ................. | H04N 21/23 386/353 |
| 2003/0231871 A1* | 12/2003 | Ushimaru | ......... | H04N 21/4394 386/207 |
| 2008/0080841 A1* | 4/2008 | Aso | ....................... | H04N 19/44 386/248 |
| 2012/0207215 A1* | 8/2012 | Ryu | ................ | G11B 20/10527 375/240.12 |
| 2017/0078687 A1* | 3/2017 | Coward | .............. | H04N 19/395 |

FOREIGN PATENT DOCUMENTS

JP 2009525705 A 7/2009
JP 2013509818 A 3/2013

* cited by examiner

*Primary Examiner* — Farzana B Huq
(74) *Attorney, Agent, or Firm* — Canon U.S.A., Inc. IP Division

(57) ABSTRACT

A video data transmission apparatus that transmits video data including a plurality of frame images in units of segment data of a predetermined segment time includes a generation unit, a reception unit, a determination unit and a transmission unit. The generation unit generates the plurality of frame images of a predetermined frame period. The reception unit receives specification information that specifies a length of the segment time from an external apparatus. The determination unit determines the length of the segment time based on the predetermined frame period and the specification information. The transmission unit transmits information for acquiring the segment data, the information indicating the length of the segment time determined by the determination unit, to the external device.

8 Claims, 13 Drawing Sheets

FIG.5

```xml
<?xml version="1.0"?>
<MPD
    xmlns:xsi="http://www.w3.org/2001/XMLSchema-instance" xmlns="urn:mpeg:dash:schema:mpd:2011"
    xsi:schemaLocation="urn:mpeg:DASH:schema:MPD:2011 DASH-MPD.xsd"
    profiles="urn:mpeg:dash:profile:isoff-live:2011" minimumUpdatePeriod="PT2S"
    timeShiftBufferDepth="PT30M" availabilityStartTime="2017-04-25T17:00:00"
    minBufferTime="PT4S" type="dynamic">
    <BaseURL>http://192.169.100.1:80/video/</BaseURL>
    <Period id="0" start="0">
        <AdaptationSet id="0" segmentAlignment="true">
            <BaseURL>/stream1/</BaseURL>
            <Representation id="1" mimeType="video/mp4" codecs="avc1.4D401F"
                width="256" height="144" frameRate="25" bandwidth="65536">
                <SegmentTemplate timescale="2500" media="/media$RepresentationID$_$Number$.m4s"
                    startNumber="1" initialization="/init$RepresentationID$.mp4">
                    <SegmentTimeline>
                        <S t="0" d="300" r="-1"/>
                    </SegmentTimeline>
                </SegmentTemplate>
            </Representation>
        </AdaptationSet>
    </Period>
</MPD>
```

FIG.8

| NO. | FRAME PERIOD [milliseconds] |
|---|---|
| 1 | 40 |
| 2 | 80 |
| 3 | 120 |

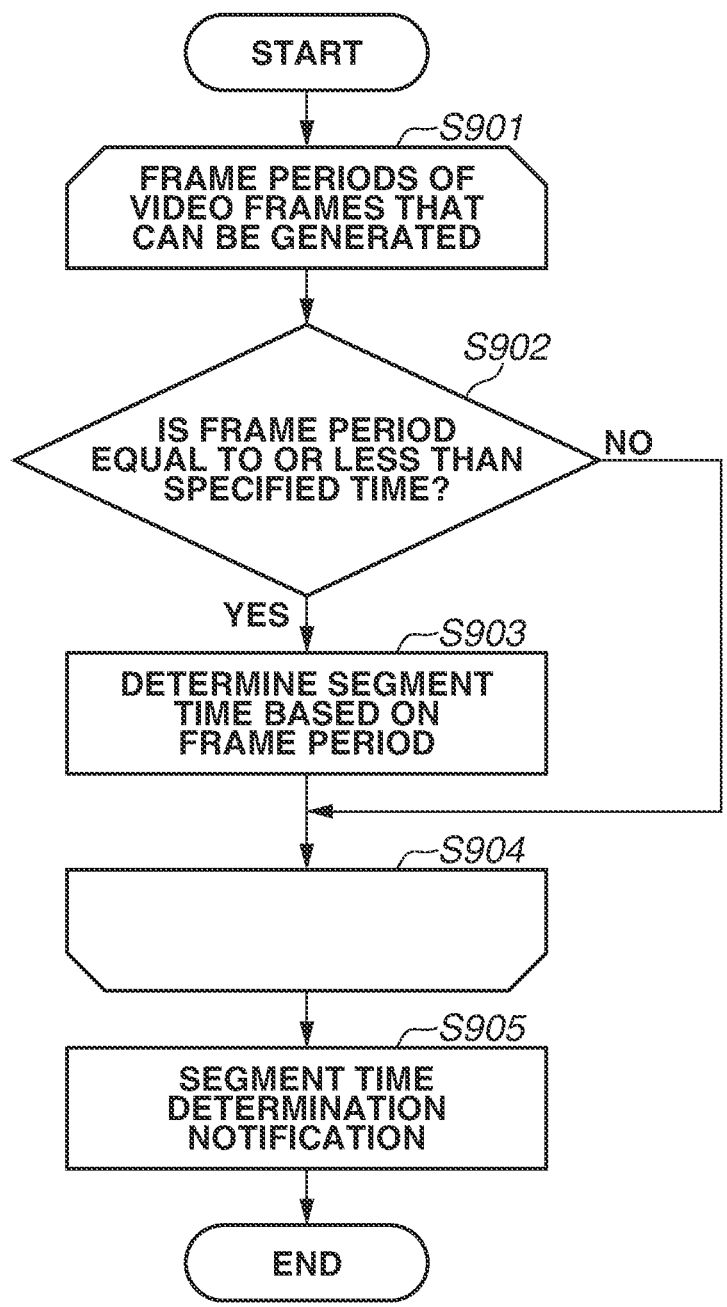

FIG.10

```xml
<?xml version="1.0"?>
<MPD
  xmlns:xsi="http://www.w3.org/2001/XMLSchema-instance" xmlns="urn:mpeg:dash:schema:mpd:2011"
  xsi:schemaLocation="urn:mpeg:DASH:schema:MPO:2011 DASH-MPD.xsd"
  profiles="urn:mpeg:dash:profile:isoff-live:2011" minimumUpdatePeriod="PT2S"
  timeShiftBufferDepth="PT30M" availabilityStartTime="2017-04-25T17:00:00"
  minBufferTime="PT4S" type="dynamic">
  <BaseURL>http://192.169.100.1:80/video/</BaseURL>

<Period id="0" start="0">
    <AdaptationSet id="0" segmentAlignment="true">
      <Representation id="1" mimeType="video/mp4" codecs="avc1.4D401F"
          width="256" height="144" frameRate="25" bandwidth="65536">
        <BaseURL>stream1/</BaseURL>
        <SegmentTemplate timescale="2500" media="/media$RepresentationID$_$Number$.m4s"
          startNumber="1" initialization="/init $RepresentationID$.mp4"
          <SegmentTimeline>
            <S t="0" d="200" r="-1"/>
          </SegmentTimeline>
        </SegmentTemplate>
      </Representation>
      <Representation id="2" mimeType="video/mp4" codecs="avc1.4D401F"
          width="256" height="144" frameRate="12.5" bandwidth="32768">
        <BaseURL>stream2/</BaseURL>
        <SegmentTemplate timescale="2500" media="/media$RepresentationID$_$Number$.m4s"
          startNumber="1" initialization="/init $RepresentationID$.mp4">
          <SegmentTimeline>
            <S t="0" d="200" r="-1"/>
          </SegmentTimeline>
        </SegmentTemplate>
      </Representation>
    </AdaptationSet>
  </Period>
</MPD>
```

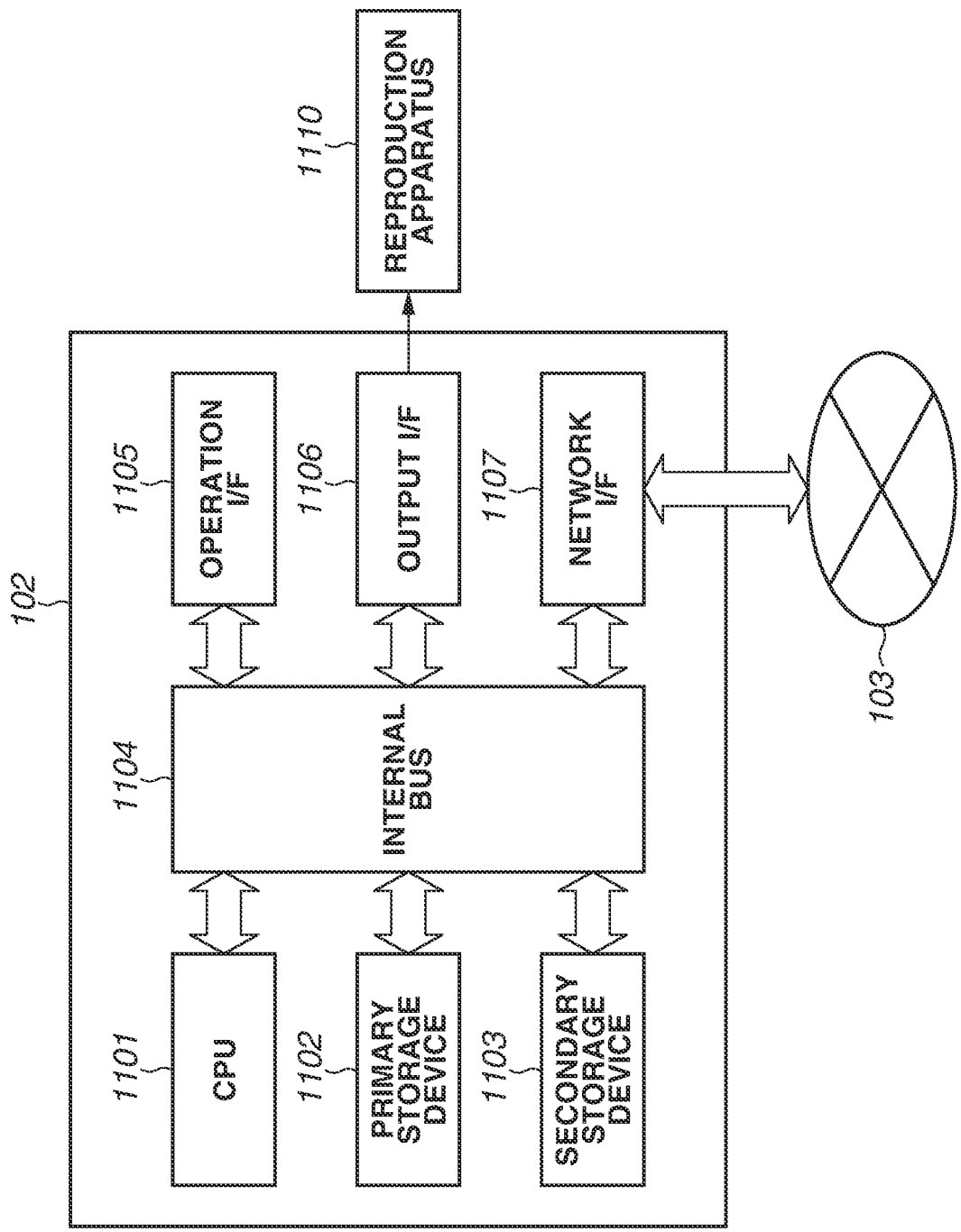

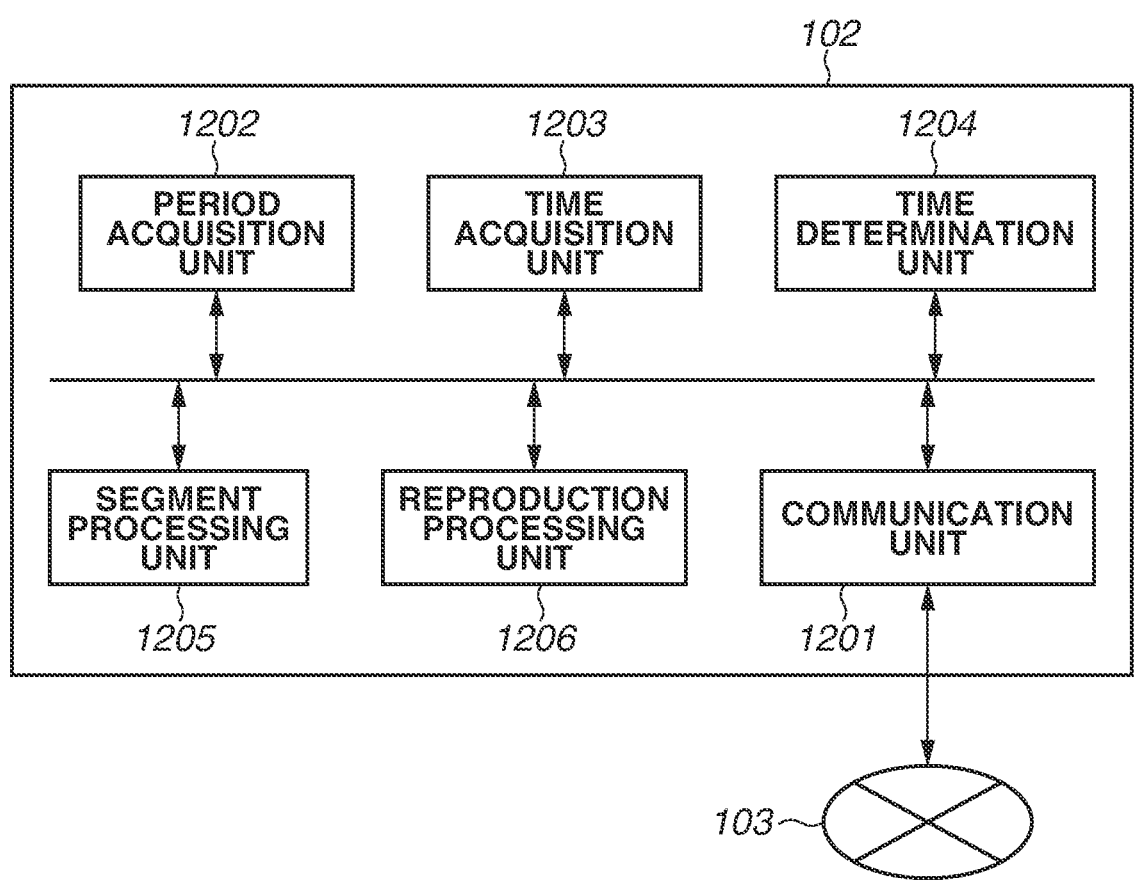

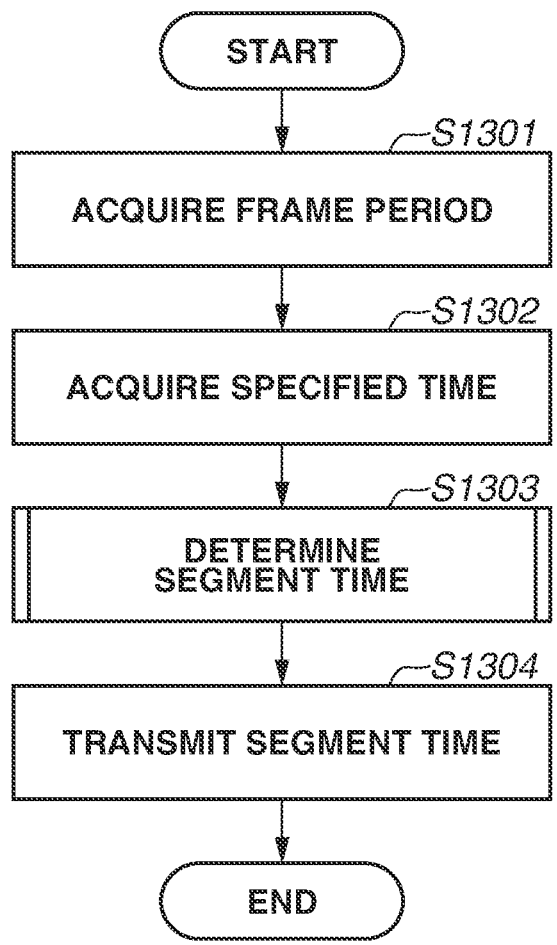

VIDEO DATA TRANSMISSION APPARATUS, VIDEO DATA TRANSMITTING METHOD, AND STORAGE MEDIUM

BACKGROUND OF THE INVENTION

Field of the Invention

The present invention relates to a technique for transmitting video data.

Description of the Related Art

In recent years, a system using an adaptive streaming technique for dividing a stream of media data including video data and audio data into media segments in units of segment duration and transmitting the media segments has become popular. There are two adaptive streaming techniques. The first technique is Dynamic Adaptive Streaming over Hypertext Transfer Protocol (HTTP) (DASH) standardized by Moving Picture Experts Group (MPEG). The second technique is HTTP Live Streaming (HLS).

In adaptive streaming based on the DASH standard, first, a client apparatus acquires a Media Presentation Description (MPD) file. In an MPD file, one or more Representations, which are information about media segments in a sequence that can be transmitted by a distribution server, are described. The client apparatus selects an appropriate Representation from among the Representations included in the MPD file depending on the display performance and the communication state of the client apparatus. Thereafter, the client apparatus downloads and reproduces media data in a video format of the MPEG2-Transport Streaming (TS) or International Organization for Standardization (ISO) Base Media File Format (ISOBMFF) for each media segment according to the description of the MPD.

Japanese Unexamined Patent Application Publication (Translation of PCT Application) No. 2009-525705 and Japanese Unexamined Patent Application Publication (Translation of PCT Application) No. 2013-509818 disclose a method by which a distribution server transmits a segment in response to a request from a client apparatus. Japanese Unexamined Patent Application Publication (Translation of PCT Application) No. 2009-525705 discloses a method for changing the data size of a segment by adjusting the amount of motion information to be encoded in response to a request for changing the data size of the segment. Japanese Unexamined Patent Application Publication (Translation of PCT Application) No. 2009-525705 discloses a method of outputting a segment of a requested time section in response to a request for specifying a time section.

However, in the conventional techniques discussed in the above-mentioned Japanese Unexamined Patent Application Publication (Translation of PCT Application) Nos. 2009-525705 and 2013-509818, a phenomenon to be described below may occur in the client apparatus particularly when a segment of a segment time desired by the client apparatus is not prepared in the distribution server at the time of distribution of a live stream. For example, when the segment time is too long, there may be a case where the production delay from generation of a segment to reception and reproduction of the segment by the client apparatus is increased. Alternatively, when the segment time is too short, the overhead of processing of a request from the client apparatus to the distribution server is increased, and the reproduction of segments may be temporarily interrupted.

SUMMARY OF THE INVENTION

Therefore, the present disclosure is directed to a video data transmission apparatus capable of reproducing segments without interruption while reducing the reproduction delay.

According to an aspect of the present disclosure, a video data transmission apparatus that transmits video data including a plurality of frame images in units of segment data of a predetermined segment time, includes a generation unit configured to generate the plurality of frame images of a predetermined frame period, a reception unit configured to receive specification information that specifies a length of the segment time from an external apparatus, a determination unit configured to determine the length of the segment time based on the predetermined frame period and the specification information, and a transmission unit configured to transmit information for acquiring the segment data, the information indicating the length of the segment time determined by the determination unit, to the external device.

Further features of the present invention will become apparent from the following description of exemplary embodiments with reference to the attached drawings.

BRIEF DESCRIPTION OF THE DRAWINGS

FIG. 5 is a diagram illustrating an example of a Media Presentation Description (MPD) file according to a first exemplary embodiment.

FIG. 8 is a diagram illustrating a list of frame periods in a second exemplary embodiment.

FIG. 9 is a flowchart illustrating processing performed by an information generating apparatus of the second exemplary embodiment.

FIG. 10 is a diagram illustrating an example of an MPD file according to the second exemplary embodiment.

FIG. 11 is a diagram illustrating a hardware configuration example of a client apparatus.

FIG. 12 is a diagram illustrating a functional configuration example of the client apparatus.

FIG. 13 is a flowchart illustrating segment time determination processing according to a third exemplary embodiment.

DESCRIPTION OF THE EMBODIMENTS

The exemplary embodiments of the present disclosure will be described below with reference to the accompanying drawings.

Figure 1:
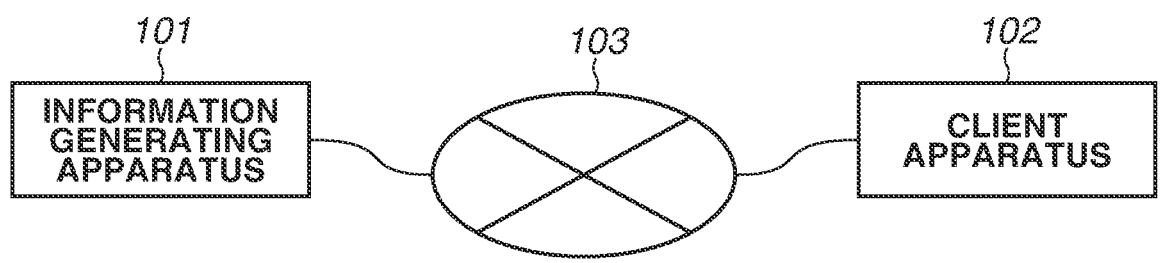
FIG. 1 is a diagram illustrating a schematic configuration example of a system according to an exemplary embodiment.

A first exemplary embodiment will be described. FIG. 1 is a diagram illustrating a schematic configuration example of a system including an information generating apparatus 101 and a client apparatus 102, which are examples of an information processing apparatus (video data transmission apparatus) of the present exemplary embodiment. In the present exemplary embodiment, for example, a system utilizing an adaptive streaming technique for transmitting media segments obtained by dividing a live stream of media data including video data and audio data acquired in real time into segments of a unit time is taken as an example.

The system illustrated in FIG. 1 includes the information generating apparatus 101 and the client apparatus 102 according to the present exemplary embodiment, and a network 103. For example, the information generating apparatus 101 is a network camera, and the network 103 is an internet protocol (IP) network such as a local area network (LAN). The information generating apparatus 101 is an apparatus capable of generating media segments by dividing a stream of media data including at least one of video and audio per unit of time utilizing an adaptive streaming technique. In the present exemplary embodiment, the information generating apparatus 101 has the function of a distribution server, but a distribution server may be provided separately. The client apparatus 102 is an external apparatus with respect to the information generating apparatus 101, and is a communication device capable of communicating with the information generating apparatus 101 via the network 103. In the present exemplary embodiment, it is assumed that the client apparatus 102 is, for example, a personal computer (PC) capable of receiving and reproducing data of media segments transmitted from the information generating apparatus 101 utilizing an adaptive streaming technique.

As described above, the information generating apparatus 101 and the client apparatus 102 are connected to each other via the network 103 so that they can communicate with each other.

The client apparatus 102 can transmit various request commands to the information generating apparatus 101. In the present exemplary embodiment, commands to be transmitted from the client apparatus 102 to the information generating apparatus 101 include a playlist transmission request and a segment transmission request, which will be described below. Although the details will be described below, for example, the client apparatus 102 can put unit time information including a specified time specifying a unit time of segments in a command of a playlist transmission request, in the present exemplary embodiment.

Upon receiving various request commands from the client apparatus 102, the information generating apparatus 101 returns a response to the commands to the client apparatus 102. Although the details will be described below, in the case of the present exemplary embodiment, upon reception of a command of a playlist transmission request from the client apparatus 102, the information generating apparatus 101 acquires information about the specified time specifying a unit time of segments from the unit time information included in the command. The information generating apparatus 101 then determines at least one segment time as a candidate of unit time of segments based on the specified time, and can transmit the information about the playlist including the unit time of segments to the client apparatus 102. In addition, the information generating apparatus 101 is configured to generate segment information by dividing the stream of the media data into segments of the unit time of segments, and can transmit the segment information to the client apparatus 102.

The network 103 includes a plurality of routers, switches, cables and the like that conforms to a communication standard such as Ethernet (registered trademark). As the network 103, any network from the Internet to a wireless local area network (LAN) can be used as long as the network allows communication between the information generating apparatus 101 and the client apparatus 102, and its communication standard, scale, or configuration is not limited. In FIG. 1, for the sake of simplification of description, the number of information generating apparatus 101 is one, but may be two or more. In addition to the client apparatus 102, one or more client apparatuses may be connected to the information generating apparatus 101 via the network 103.

Figure 2:
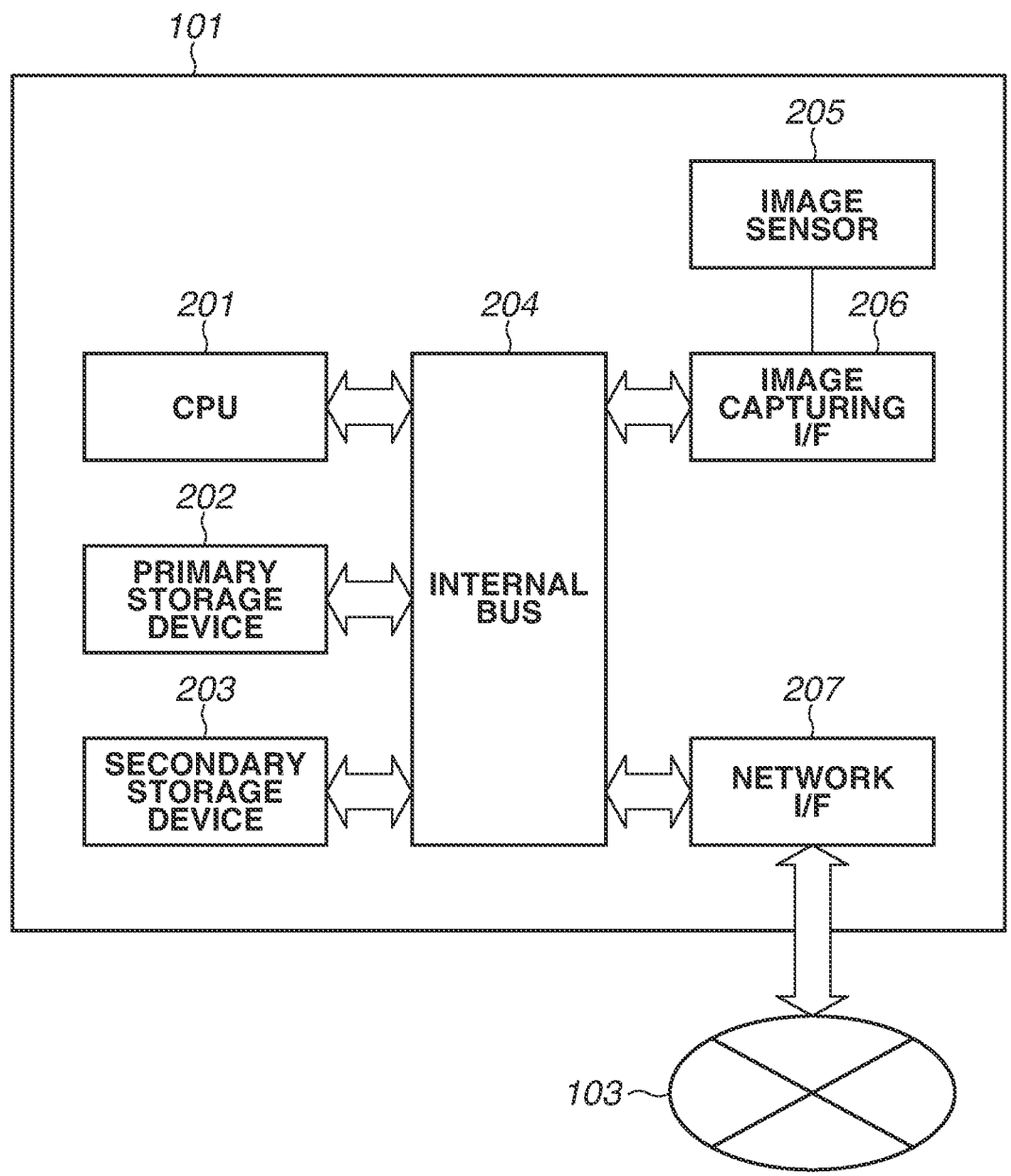
FIG. 2 is a diagram illustrating a hardware configuration example of an information generating apparatus.

FIG. 2 is a diagram illustrating a hardware configuration example of the information generating apparatus 101 according to the present exemplary embodiment. The information generating apparatus 101 includes a central processing unit (CPU) 201, a primary storage device 202, a secondary storage device 203, an image capturing interface (I/F) 206, and a network I/F 207, which are interconnected via an internal bus 204. The information generating apparatus 101 also includes an image sensor 205 including a charge coupled device (CCD) sensor or a complementary metal oxide Semiconductor (CMOS) sensor.

The primary storage device 202 is, for example, a random access memory (RAM), and is a writable high-speed storage device. Into the primary storage device 202, an operating system (OS), various programs, and various types of data are loaded, and the primary storage device 202 is used as a work area for the OS and various programs. The secondary storage device 203 is, for example, a flash memory, a hard disk drive (HDD), a Secure Digital (SD) card, or the like, and is a nonvolatile storage device. The secondary storage device 203 is used as a permanent storage area for the OS, various programs, and various types of data, and is also used as a short-term storage area for various types of data.

The CPU 201 loads a program stored in the secondary storage device 203 into the primary storage device 202 and executes the program, thereby realizing various types of processing according to the information generating apparatus 101 of this exemplary embodiment. The image sensor 205 is connected to the image capturing I/F 206, and real-time image data captured by the image sensor 205 is converted into data in a predetermined format and transferred to the primary storage device 202. The network I/F 207 is an interface that allows connection to the client apparatus 102 via the network 103, and is responsible for each type of processing related to communication with the client apparatus 102 and the like.

Figure 3:
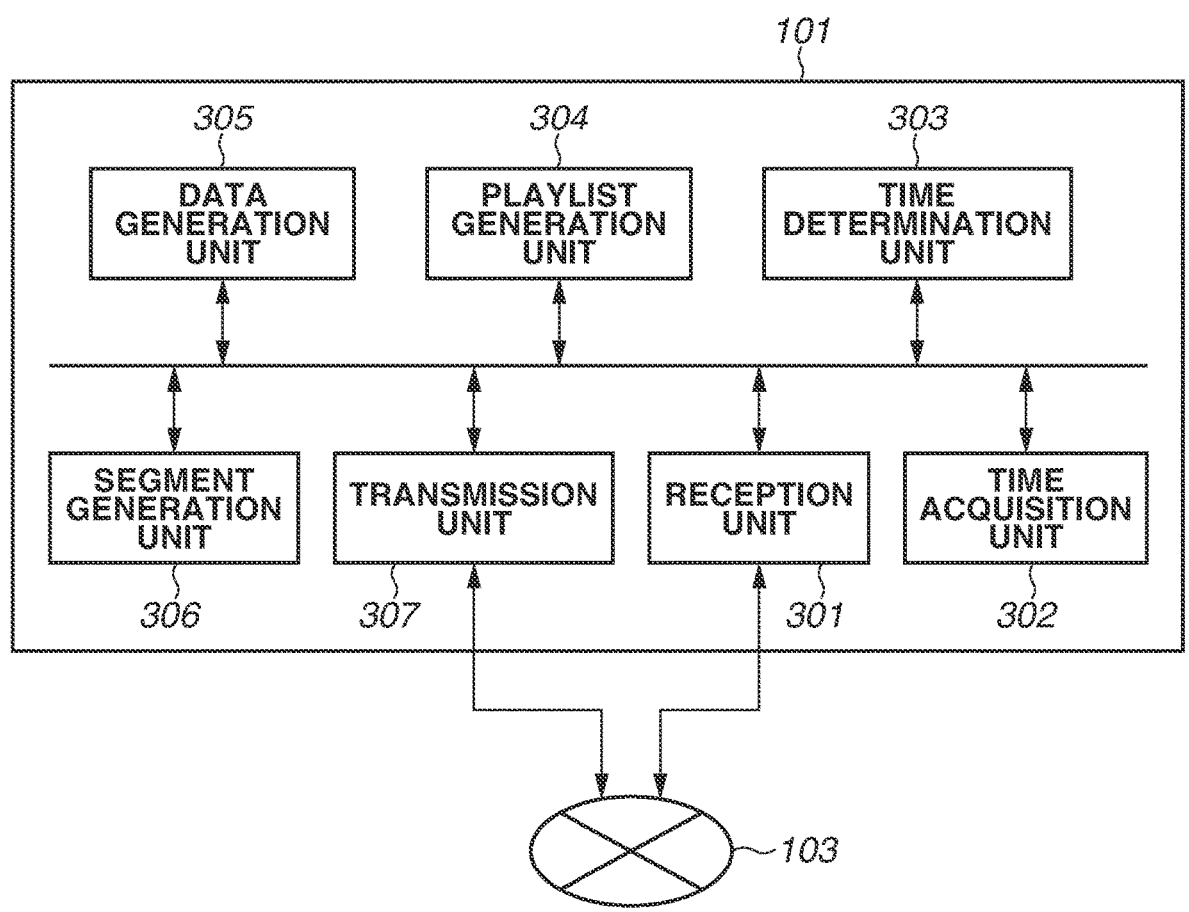
FIG. 3 is a diagram illustrating a functional configuration example of the information generating apparatus.

FIG. 3 is a diagram illustrating a functional configuration example of the information generating apparatus 101 according to the present exemplary embodiment.

The information generating apparatus 101 includes a reception unit 301, a time acquisition unit 302, a time determination unit 303, a playlist generation unit 304, a data generation unit 305, a segment generation unit 306, and a transmission unit 307. The reception unit 301, the time acquisition unit 302, the time determination unit 303, the playlist generation unit 304, the data generation unit 305, the segment generation unit 306, and the transmission unit 307 are processing units that function when the CPU 201 in FIG. 2 executes programs. Some of these functions may be realized by a hardware configuration, and the remaining functions may be realized by a software configuration by execution of programs.

The data generation unit 305 performs coding processing on image data transferred to the primary storage device 202 by the image capturing I/F 206, and generates a video frame and video metadata as video data. The coding method of the image data includes, for example, H.264 Advanced Video Coding (AVC) or H.265 High Efficiency Video Coding (HEVC). However, the coding method is not limited to these, and various other coding methods may be used. Any coding method may be used as long as video data can be generated.

The video metadata is data necessary for starting video reproduction such as a sequence parameter set (SPS) or a picture parameter set (PPS). The video frame is data indicating information about one of video frames as a unit. The video frames are displayed sequentially during video reproduction. The video frame and the video metadata are minimum units of video data generated by the data generation unit 305, and the segments generated by the segment generation unit 306 described below are data that may include one or more video frames or pieces of video metadata.

The video frame may be, for example, an independent frame or a dependent frame. The independent frame is a video frame, which is generated by intra-frame coding processing and does not require information about other video frames at the time of decoding, such as an I frame. The dependent frame is a video frame generated by the inter-frame coding processing and formed from differences in information from other video frames, such as a P frame or a B frame. The data generation unit 305 generates at least one independent frame for each period of a predetermined group (GOP: Group Of Picture), for example, and generates other video frames in the GOP period as dependent frames. The configuration method of the video frames is not limited to this example.

The data generation unit 305 sequentially generates video frames at constant periods (frame period). The frame period can be changed according to the setting information. The data generation unit 305 can store the setting information indicating the frame period having been used in generating the video frames in the secondary storage device 203. When the frame period is, for example, 40 milliseconds in the present exemplary embodiment, the setting information about the frame period is a value representing a time of 40 milliseconds. The data generation unit 305 can also change the resolution, coding method, transmission bit rate, and the like of the video frames according to the corresponding pieces of the setting information. The data generation unit 305 can also store the pieces of setting information indicating the resolution, coding method, transmission bit rate, and the like of the video frames used in generating the video data in the secondary storage device 203.

The reception unit 301 can receive, as various request commands from the client apparatus 102, for example, commands such as a playlist transmission request and a segment transmission request. The detailed data structure of the playlist and the segment will be described below.

Upon receiving a playlist transmission request command from the client apparatus 102, the reception unit 301 transmits a playlist transmission request reception notification to the time acquisition unit 302. The playlist transmission request is a transmission request for a playlist generated by the playlist generation unit 304. In the present exemplary embodiment, the playlist transmission request command can include unit time information as a query or the like for requesting a segment time, which is a time length of segments generated by the segment generation unit 306, in addition to the path of the playlist itself. When the playlist transmission request command includes unit time information, the reception unit 301 transmits the unit time information included in the playlist transmission request reception notification to the time acquisition unit 302.

In the present exemplary embodiment, the unit time information included in the playlist transmission request is information including a specified time that is specification of unit time of segments specified by the client apparatus 102 (specification information). In this exemplary embodiment, the specified time is set by the client apparatus 102 based on its own display performance, processing capability, communication status, and the like, but may be a time set in advance in the client apparatus 102.

As a format of the unit time information, for example, a time length format or a frame number format can be used.

When the time length format is used, the unit time information includes the time length of the segment time (specified time) requested by the client apparatus 102, and "duration" expressing the time length of the segment time can be defined as the query parameter name of the playlist transmission request command. For example, when the client apparatus 102 requests a segment time of 120 milliseconds as the time length X, the time length X should be defined as the time length X=120, and "duration=120" should be included in the playlist transmission request command as a query.

When the frame number format is used, the unit time information includes a value Y indicating a time equal to Y times the frame period as information indicating a segment time (specified time) requested by the client apparatus 102. When the frame number format is used, as a query parameter of the playlist transmission request command, "frame" capable of expressing such value Y may be defined. For example, when the client apparatus 102 requests a segment time of 120 milliseconds, the value Y should be set to 3 since the frame period is 40 milliseconds, and "frame=3" should be included in the playlist transmission request command as a query.

The format of the unit time information may be a format other than the time length format or the frame number format, and may be any format capable of expressing the unit time.

Upon receiving the playlist transmission request reception notification from the reception unit 301, the time acquisition unit 302 acquires the specified time from the unit time information included in the notification, and performs specified time acquisition notification to time determination unit 303. The specified time acquisition notification indicates the specified time.

The time acquisition unit 302 may convert the unit time information included in the playlist transmission request reception notification received from the reception unit 301 into information in a predetermined format.

For example, when the unit time information received from the reception unit 301 includes "duration=X" of the above-described time length format, the specified time is expressed by the following expression (1).

$$\text{(specified time)} = X \text{ [milliseconds]} \quad (1)$$

When the unit time information received from the reception unit 301 includes "frame=Y" of the above-described frame number format, the specified time can be calculated using the following expression (2).

$$\text{(frame period of data generation unit 305)} \times Y \text{ [milliseconds]} \quad (2)$$

The time acquisition unit 302 is configured to read the frame period used by the data generation unit 305 from the secondary storage device 203.

Upon receiving the specified time acquisition notification from the time acquisition unit 302, the time determination unit 303 determines at least one segment time, which is a candidate for a unit time of media segments to be described below, based on the specified time indicated by the specified time acquisition notification. The details of processing of determining the segment time will be described below. The time determination unit 303 then transmits a segment time determination notification to the playlist generation unit 304. The segment time determination notification indicates the segment time determined by the time determination unit 303.

Upon receiving the segment time determination notification from the time determination unit 303, the playlist generation unit 304 generates a playlist including the segment time indicated by the segment time determination notification, and stores the playlist in the primary storage device 202.

As an example of a playlist, a Media Presentation Description (MPD) file defined in ISO/IEC23009-1 can be used. In an MPD file, information about segments which can be transmitted by the information generating apparatus 101, segment time information, resolution information about video data in segments, frame rate information, coding method information, transmission bit rate information, and the like can be described as transmission media information.

Thereafter, the playlist generation unit 304 transmits a playlist transmission instruction to the transmission unit 307 to cause the transmission unit 307 to transmit playlist data to the client apparatus 102. The playlist generation unit 304 may instruct the transmission unit 307 to transmit an error response such as HTTP 503 to the client apparatus 102 when the playlist generation is temporarily disabled due to, for example, an increase in process load of the information generating apparatus 101.

Upon receiving a playlist transmission instruction from the playlist generation unit 304, the transmission unit 307 reads the playlist data stored in the primary storage device 202 and transmits the playlist data to the client apparatus 102.

Upon receiving the segment transmission request command from the client apparatus 102, the reception unit 301 instructs the transmission unit 307 to transmit a response to the client apparatus 102. The segment transmission request is a transmission request for a segment generated by the segment generation unit 306. When the segment, for which the transmission request has been performed, is already generated by the segment generation unit 306 and exists in the primary storage device 202, the transmission unit 307 transmits data on the segment, for which the transmission request has been performed, to the client apparatus 102 as a response. On the other hand, when the segment, for which the transmission request has been performed, does not exist in the primary storage device 202, the transmission unit 307 can transmit an error response such as HTTP 404.

The segment generation unit 306 adds a header portion to the video metadata and the video frame generated by the data generation unit 305 to generate an initialization segment and a media segment respectively, and stores them in the primary storage device 202. Hereinafter, the initialization segment and the media segment are collectively referred to as segments. Details of the initialization segment and the media segment will be described below. A segment may have a structure, for example, as defined in ISO/IEC 14496-12. The segment generation unit 306 generates a media segment including video frames. The number of video frames corresponds to the time length of the segment time determined by the time determination unit 303. After generating segments and storing the segments in the primary storage device 202, the segment generation unit 306 instructs the transmission unit 307 to transmit the segments.

Upon receiving a segment transmission instruction from the segment generation unit 306, the transmission unit 307 reads a segment corresponding to the transmission instruction from the primary storage device 202 and transmits the segment to the client apparatus 102. Here, an example is given in which the transmission unit 307 transmits segments after receiving a segment transmission request command from the client apparatus 102, but the present disclosure is not limited thereto. For example, when a protocol such as HTTP/2 or Websocket is used, the transmission unit 307 can transmit one segment after another upon completion of segment generation by the segment generation unit 306 even if the transmission unit 307 does not receive a transmission request from the client apparatus 102. In this case, the segment generation unit 306 transmits a segment generation notification to the transmission unit 307 every time when the generation of a segment is completed, and the transmission unit 307 detects the completion of generation of the segment by receiving the segment generation notification and transmits the segments one after another upon completion of the generation of the segment.

Figure 4:
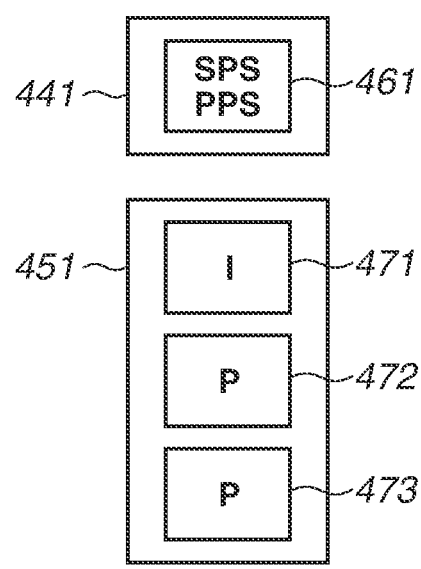
FIG. 4 is a diagram for describing data structures of an initialization segment and a media segment.

FIG. 4 is a diagram for describing the data structures of an initialization segment 441 and a media segment 451 generated by the segment generation unit 306.

As illustrated in FIG. 4, the initialization segment 441 includes video metadata 461 including SPS, PPS, and the like described above. The media segment 451 may include one or more video frames. The media segment 451 includes video frames 471 to 473 in the coding order. For example, the video frame 471 can be an independent frame, and the video frames 472 and 473 can be dependent frames. Although the top video frame of the media segment 451 is defined as an independent frame here, there may be a media segment in which the top video frame is not an independent frame. The information generating apparatus 101 can sequentially transmit a plurality of media segments including the media segment 451 through the network I/F 207 in response to a transmission request from the client apparatus 102.

The segment time of the media segment 451 can be calculated using the following expression (3).

$$\text{(frame period of data generation unit 305)} \times \text{(number of frames of video frames included in media segment 451)} = 40 \text{ [milliseconds]} \times 3 = 120 \text{ [milliseconds]} \quad (3)$$

FIG. 5 is a diagram illustrating an example of the structure of an MPD file 580 as a playlist to be transmitted from the information generating apparatus 101 to the client apparatus 102.

The playlist generation unit 304 creates the MPD file 580 based on the setting information such as the frame period stored in the secondary storage device 203 and the segment time indicated by the segment time determination notification from the time determination unit 303.

The MPD file 580 has a hierarchical structure including elements, i.e., Period 581, AdaptationSet 582, Representation 583, and SegmentTemplate 584 in this order. The hierarchical structure can define information about segments that can be transmitted by the information generating apparatus 101 to the client apparatus 102.

The Period 581 defines the range of time period within which lower level elements are defined. For example, in the Period 581, "start", which is the start time of the Period 581, is defined as 0, and "duration", which is the time length of the Period 581, is not defined. Thus, information about all segments to be sequentially transmitted by the information generating apparatus 101 can be defined.

The AdaptationSet 582 indicates information about a video, and can define, for example, a video in the same Period 581 from another viewpoint.

The Representation 583 can define resolution, a frame rate, and the like as information about a video of a segment. The id information 595 is identification (id) information for identifying the Representation 583, and indicates that the id of the Representation 583 is 1 in this example. The Representation 583 includes, as transmission media information, resolution information 585, frame rate information 586, coding method information 592, transmission bit rate information 593, segment time information in SegmentTemplate 584 described below, and the like. The resolution information 585, the frame rate information 586, the coding method information 592, and the transmission bit rate information 593 are described based on the above-described pieces of setting information stored in the secondary storage device 203.

The resolution information 585 indicates that width× height is, e.g., 256×144 [pixels] as the resolution of the video frame of the segment. The frame rate information 586 indicates that the number of video frames in the segment to be generated per 1 second, i.e., the reciprocal number of the frame period expressed in the unit of second is, for example, 25. The coding method information 592 indicates that the coding method of the video in the segment is, e.g., H.264/AVC Main Profile Level 3.1. The transmission bit rate information 593 indicates that the transmission bit rate at which the segment is transmitted is, e.g., 65536 [bps].

In the SegmentTemplate 584, the segment time of the media segment of the Representation 583 can be described by using the timescale information 587 and the segment time information 588 that satisfy the following expression (4).

(segment time of Representation 583)=(segment time
  information 588)(timescale information 587)
  =300/2500 [seconds]=120 [milliseconds]           (4)

The segment time of the Representation 583 is described so as to match the segment time determined by the time determination unit 303.

The Representation 583 also includes initialization segment uniform resource identifier (URI) information 589 and media segment URI information 590. The client apparatus 102 can access the following URIs by using RepresentationBaseURI information 594 and MPDBaseURI information 591 including the internet protocol (IP) address of the information generating apparatus 101. Then, the client apparatus 102 can acquire the initialization segment and each of the media segments defined by the Representation 583 and the SegmentTemplate 584. The client apparatus 102 can determine the initialization segment URI and the media segment URI of the Representation 583 using expressions (5) and (6), respectively, with $RepresentationID$ being 1 based on the id information 595.

(initialization segment URI of Representation 583)=
  (MPDBaseURI Information 591)+(Representa-
  tionBaseURI information 594)+(initialization
  segment URI information 589)="http://
  192.169.100.1:80/video/stream1/init1.mp4"         (5)

(media segment URI of Representation 583)=(MPD-
  BaseURI information 591)+(RepresentationBa-
  seURI information 594)+(Media Segment URI
  information 590)="http://192.169.100.1:80/
  video/stream 1/media1_$Number$.m4s"              (6)

In the above expressions, element A+element B means that the character string of the element B is combined to the right of the character string of the element A. $Number$ is a template expression, and expresses the evaluation value incremented from the value of startNumber of the media segment URI information 590 in the order of time series or coding of the video in the media segment.

The actual URI of each media segment may be as follows for example. "http://192.169.100.1:80/video/stream 1/media1_1.m4s", "http://192.169.100.1:80/video/stream 1/media1_2.m4s", . . . .

Transmission of such MPD file 580 to the client apparatus 102 by the transmission unit 307 enables the client apparatus 102 to sequentially request the information generating apparatus 101 to transmit an initialization segment or media segments one after another. For example, first, the client apparatus 102 acquires an initialization segment and performs initialization processing for video reproduction. The client apparatus 102 then requests transmission of a media segment for each segment time based on the timescale information 587 and the segment time information 588 to sequentially acquire the media segments and reproduce the video.

Figure 6:
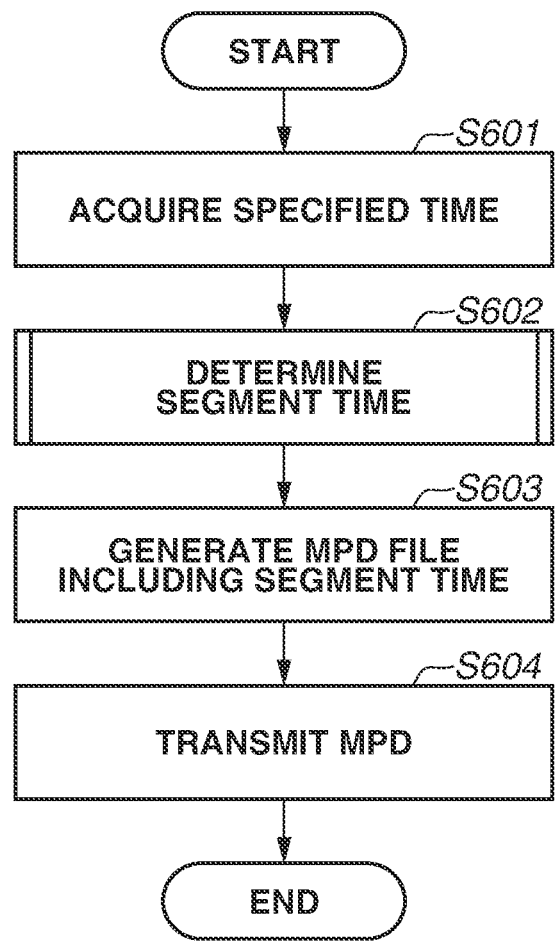
FIG. 6 is a flowchart illustrating playlist transmission processing.

FIG. 6 is a flowchart illustrating playlist transmission processing in the information generating apparatus 101 of the first exemplary embodiment.

The playlist transmission processing illustrated in the flowchart of FIG. 6 starts when the time acquisition unit 302 receives a playlist transmission request reception notification from the reception unit 301.

In step S601, the time acquisition unit 302 acquires the specified time of the segment time from the unit time information included in the playlist transmission request reception notification from the reception unit 301. The time acquisition unit 302 then transmits a specified time acquisition notification to the time determination unit 303.

In step S602, the time determination unit 303 determines at least one segment time, which is a candidate for a unit time of segments, based on the specified time included in the specified time acquisition notification from the time acquisition unit 302, and transmits a segment time determination notification to the playlist generation unit 304.

In step S603, the playlist generation unit 304 generates an MPD file 580 including the segment time indicated by the segment time determination notification from the time determination unit 303, and stores the MPD file 580 in the primary storage device 202. The playlist generation unit 304 then transmits a transmission instruction to the transmission unit 307. The transmission instruction instructs the transmission unit 307 to transmit the MPD file 580 to the client apparatus 102.

In step S604, in response to the transmission instruction of the MPD file 580 from the playlist generation unit 304, the transmission unit 307 acquires the data of the MPD file 580 stored in the primary storage device 202, and transmits the acquired data to the client apparatus 102. When the transmission of the MPD file 580 is completed, the playlist transmission processing in the information generating apparatus 101 ends.

Figure 7:
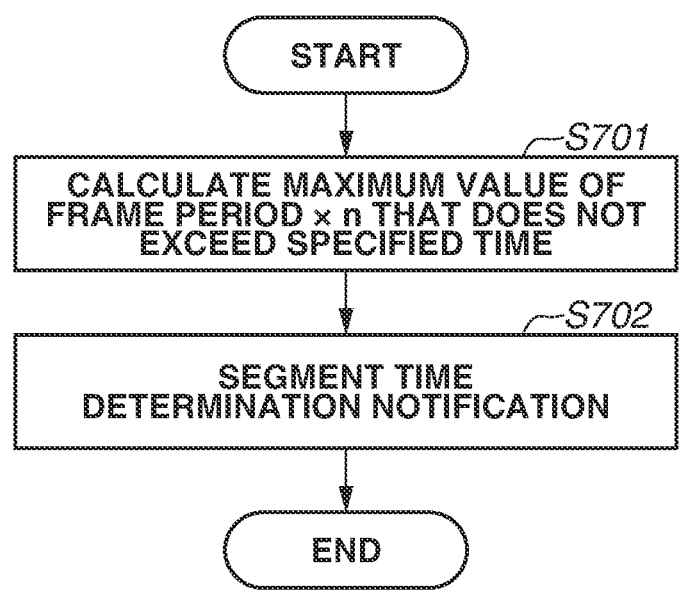
FIG. 7 is a flowchart illustrating segment time determination processing of the first exemplary embodiment.

FIG. 7 is a flowchart illustrating segment time determination processing in the time determination unit 303.

In step S701, the time determination unit 303 calculates the maximum value of (frame period)×(natural number n) that does not exceed the specified time included in the specified time acquisition notification from the time acquisition unit 302. That is, the time determination unit 303 calculates a maximum value among integer multiples of the frame period that do not exceed the specified time from the client apparatus 102 as the segment time. The segment time is a number satisfying the condition of the following expression (7).

(segment time)=(frame period of data generation unit 305)×(natural number $n$)≤(specified time acquired by time acquisition unit 302), and (specified time acquired by time acquisition unit 302)<(frame period of data generation unit 305)/($n$+1)     (7)

For example, when the specified time acquired by the time acquisition unit 302 is 150 [milliseconds], the natural number n=3, and the frame period of the data generation unit 305 is 40 [milliseconds], the time is calculated by expression (7) as follows.

(segment time)=(frame period 40 [milliseconds])× 3=120 [milliseconds]≤(specified time 150 [milliseconds]), and (specified time 150 [milliseconds])<(frame period 40 [milliseconds])×4=160 [milliseconds]

That is, in this case, 120 [milliseconds] is calculated as the segment time.

In step S702, the time determination unit 303 determines the time calculated in step S701 as the segment time, and transmits a segment time determination notification indicating the determined segment time to the playlist generation unit 304.

As described above, the information generating apparatus 101 acquires a specified time that specifies a unit time of segments from the unit time information included in the playlist transmission request (that is, a transmission request for the MPD file 580) from the client apparatus 102. The information generating apparatus 101 then enables return of segments of the segment time desired by the client apparatus 102 based on the specified time. Thus, the information generating apparatus 101 can transmit a video to the client apparatus 102 with a minimum delay.

In the above-described example, the frame period of video frames generated by the data generation unit 305 is set to 40 [milliseconds], but the frame period may be a time other than 40 [milliseconds]. In addition, the data generation unit 305 generates video frames of a single frame period, but the data generation unit 305 may be configured to simultaneously generate video frames of a plurality of frame periods in a sequence.

The segment generation unit 306 starts generation of segments when the time determination unit 303 determines the segment time, but the generation may be started at other timing. For example, the segment generation unit 306 may start generation of segments after the client apparatus 102 acquires the MPD file 580 and transmits a transmission request for segments to the information generating apparatus 101.

The specified time indicated by the specified time acquisition notification transmitted from the time acquisition unit 302 to the time determination unit 303 is a value in milliseconds, but may be, for example, a value in seconds or time expression with respect to a timescale reference such as the segment time information 588 described above. The specified time may be any other expression as long as the expression can express time length.

As described above, the time determination unit 303 determines the maximum value among values obtained by (frame period) x (natural number n) that do not exceed the specified time as the segment time, but the segment time may be determined by the following methods (a) to (d).

Method (a): The time determination unit 303 determines, as the segment time, the minimum value among values obtained by (natural number n)/(frame period) that are equal to or more than the specified time included in the specified time acquisition notification from the time acquisition unit 302, that is, the minimum value among integer multiples of the frame period that are equal to or more than the specified time.

Method (b): The time determination unit 303 estimates the transmission delay time of a media segment based on the time from the time when the transmission unit 307 transmits a packet of any data to the time when the reception unit 301 receives a response from the client apparatus 102. The time determination unit 303 also sets any time length equal to or more than the transmission delay time as the minimum waiting time and sets the time length as a predetermined threshold value of the segment time. When the specified time included in the specified time acquisition notification from the time acquisition unit 302 is equal to or less than the threshold value, i.e., equal to or less than the minimum waiting time, the time determination unit 303 determines the threshold value, i.e., the minimum waiting time, as the segment time.

Method (c): Regardless of the frame period used by the data generation unit 305 or the segment time determined by the time determination unit 303, the time determination unit 303 sets any time length equal to or more than the minimum time taken for the segment generation unit 306 to generate a segment, as the minimum waiting time. That is, the minimum waiting time is set as a predetermined threshold value for the segment time. When the specified time included in the specified time acquisition notification from the time acquisition unit 302 is equal to or less than the minimum waiting time, i.e., equal to or less than the threshold value, the time determination unit 303 determines the threshold value, i.e., the minimum waiting time, as the segment time.

Method (d): The time determination unit 303 sets, to a predetermined threshold value as the maximum waiting time, the time from generation of an independent frame to generation of the next independent frame. An independent frame is a frame that can be decoded without using any other frame out of the video frames continuously generated by the data generation unit 305. For example, the maximum waiting time that is possible in a GOP is set as a threshold value. When the specified time included in the specified time acquisition notification from the time acquisition unit 302 is equal to or more than the threshold value, i.e., equal to or more than the maximum waiting time, the time determination unit 303 determines the threshold value, i.e., the maximum waiting time, as the segment time.

According to the methods (b) to (d) out of the methods (a) to (d), the time determination unit 303 sets the maximum time or the minimum time taken for the segment generation unit 306 to generate the segment as a predetermined threshold value. The time determination unit 303 compares the specified time included in the specified time acquisition notification from the time acquisition unit 302 with the predetermined threshold value, and determines whether to set the predetermined threshold to the segment time based on the comparison result.

Alternatively, the information generating apparatus 101 may use, as candidates for the segment time, the maximum value among values obtained by (frame period) x (natural number n) that do not exceed the specified time and a plurality of segment times determined according to different methods such as the methods (a) to (d). The segment times determined according to the different methods may be included as segment time information in a plurality of Representations or AdaptationSets that are different to each other in the MPD file. Further, the time determination unit 303 may determine a plurality of segment times, and the segment generation unit 306 may be configured to simultaneously generate segments of the plurality of segment times. In this case, the client apparatus 102 can transmit, to the information generating apparatus 101, a transmission request for segments generated based on an appropriate segment time selected from the MPD file including a plurality of segment time candidates depending on its own display performance or communication status.

In addition, the data generation unit 305 can also generate video frames at indefinite time intervals (referred to as indefinite period video frames) without having a constant frame period. In this case, the segment generation unit 306 may generate a media segment including indefinite period video frames for the segment time determined by the time determination unit 303.

In the above-described example, the specified time and the determined segment time are set to be an integer multiple of the frame period, but segments of segment time that is not an integer multiple of the frame period may be generated by, for example, adjusting the display time of a part of frames using information in the header portion of the segment or the like.

The segment time may be determined for each stream of media data.

In the above-described example, the segment generated by the segment generation unit 306 includes video data. However, the segment generation unit 306 may be configured to generate a media segment including audio data.

In the above-described example, the information generating apparatus 101 has the functions of the data generation unit 305 and the segment generation unit 306, but may be configured to exclude these functions by, for example, communicating with other apparatuses having these functions. In this case, the information generating apparatus 101 may include only the reception unit 301, the time acquisition unit 302, the time determination unit 303, the playlist generation unit 304, and the transmission unit 307, and generate a playlist.

As described above, in the first exemplary embodiment, based on the segment time (specified time) desired by the client apparatus 102, the segment time of segments that the information generating apparatus 101 can transmit is determined and presented to the client apparatus 102. Thus, according to the present exemplary embodiment, segments can be reproduced without interruption while minimizing reproduction delay.

An information generating apparatus 101 according to a second exemplary embodiment will be described below. Since the configuration of the information generating apparatus 101 of the second exemplary embodiment is similar to that of the above-described first exemplary embodiment, illustration of the configuration and the like is not provided.

In the second exemplary embodiment, a description will be given of a portion different from the first exemplary embodiment.

Figure 8:
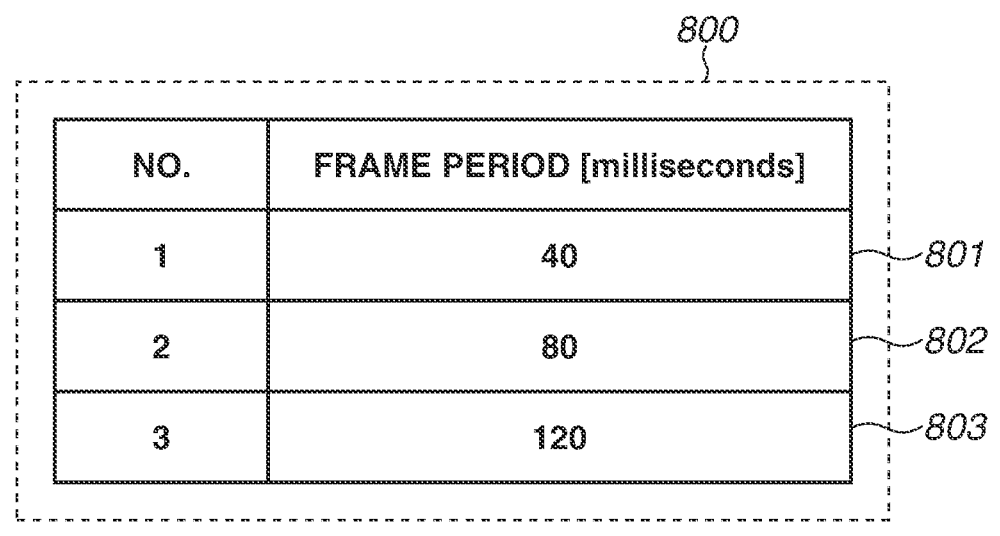

FIG. 8 is a diagram illustrating an example of a list of frame periods (frame period list 800) of video frames that can be generated by the data generation unit 305 in the second exemplary embodiment.

The data generation unit 305 can create the frame period list 800 and store the frame period list 800 in the secondary storage device 203. The frame period list 800 illustrated in FIG. 8 indicates that the data generation unit 305 can generate video frames of 40 [milliseconds], 80 [milliseconds], and 120 [milliseconds] respectively corresponding to frame periods 801, 802, and 803. The frame period list 800 is not limited to this example, and may be anything as long as the list can indicate frame periods of frames that can be generated by the data generation unit 305.

FIG. 9 is a flowchart illustrating segment time determination processing performed by the time determination unit 303 of the second exemplary embodiment. In the second exemplary embodiment, the segment time determination processing of step S602 in the flowchart of FIG. 6 of the first exemplary embodiment is replaced with the processing of the flowchart of FIG. 9.

First, the time determination unit 303 starts a loop processing from step S901 to step S904 for frame periods indicated in the frame period list 800. When the processing for all of the frame periods included in the frame period list 800 is completed, the time determination unit 303 ends the loop processing from step S901 to step S904, performs segment time determination notification, and then ends the segment time determination processing.

In the loop processing from step S901 to step S904, the time determination unit 303 first determines, as the processing in step S902, whether the frame period included in the frame period list 800 is equal to or less than the specified time in the specified time acquisition notification from the time acquisition unit 302. If the time determination unit 303 determines that the frame period included in the frame period list 800 is equal to or less than the specified time (Yes in step S902), the processing proceeds to step S903, and if the time determination unit 303 determines that the frame period included in the frame period list 800 exceeds the specified time (No in step S902), the processing proceeds to step S904. In the present exemplary embodiment, for example, when the specified time is set to 100 [milliseconds], the processing proceeds to step S903 for the frame periods 801 and 802, and proceeds to step S904 for the frame period 803. The specified time may be other than 100 [milliseconds].

In step S903, the time determination unit 303 determines the segment time based on the specified time indicated by the specified time acquisition notification from the time acquisition unit 302. As a method for calculating the segment time, for example, various methods described in the first exemplary embodiment can be used. When the time determination unit 303 determines, for example, the maximum value of (frame period) x (natural number n) that does not exceed the specified time, as the segment time, the segment time for the frame period 801 is determined by expression (8) and the segment time for the frame period 802 is determined by expression (9).

(segment time)=(40 [milliseconds] of frame period 801)×2=80 [milliseconds]<100 [milliseconds]     (8)

(segment time)=(80 [milliseconds] of frame period 802)×1=80 [milliseconds]<100 [milliseconds]     (9)

The segment time determined for each frame period in step S903 is stored as information associated with the frame period in the primary storage device 202.

If the time determination unit 303 determines that the loop processing for the frame periods indicated by the frame period list 800 continues in step S904, the processing returns to step S902. When the loop processing for the frame periods indicated by the frame period list 800 is completed, the processing proceeds to step S905.

In step S905, the time determination unit 303 transmits a segment time determination notification indicating the segment time to the playlist generation unit 304, and the segment time determination processing ends.

FIG. 10 is a diagram illustrating an example of the structure of an MPD file 1000 as a playlist to be transmitted to the client apparatus 102 from the information generating apparatus 101 of the second exemplary embodiment.

Based on the segment time indicated by the segment time determination notification, the playlist generation unit 304 creates one Representation for each of frame periods with which segment times stored in the primary storage device 202 are associated, and creates the MPD file 1000.

In the MPD file 1000, two Representations, i.e., Representations 1002 and 1003 are defined in an AdaptationSet 1001.

The Representation 1002 includes frame rate information 1004 corresponding to the frame period 801. Thus, the client apparatus 102 can calculate the segment time of a media segment indicated by the Representation 1002 by using timescale information 1005, segment time information 1006, and the following expression (10).

(Segment Time of Representation 1002)=(Segment Time Information 1006)/(Timescale Information 1005)=200/2500 [seconds]=80 [milliseconds]  (10)

The Representation 1003 includes frame rate information 1007 corresponding to the frame period 802. Thus, the client apparatus 102 can calculate the segment time of a media segment indicated by the Representation 1003 by using timescale information 1008, segment time information 1009, and the following expression (11).

(Segment Time of Representation 1003)=(Segment Time Information 1009)/(Timescale Information 1008)=200/2500 [seconds]=80 [milliseconds]  (11)

The client apparatus 102 having acquired the MPD file 1000 selects an appropriate Representation from the Representations 1002 and 1003 depending on its display performance and communication state. Thus, the client apparatus 102 can request the information generating apparatus 101 to transmit an initialization segment or media segments.

As described above, the information generating apparatus 101 of the second exemplary embodiment compares each frame period of video frames that can be generated by the data generation unit 305 with the specified time of a unit time of segments included in the playlist transmission request. The information generating apparatus 101 is configured to return segments of a segment time desired by the client apparatus 102 for frame periods of video frames that can be generated by the data generation unit 305. As a result, the information generating apparatus 101 can transmit video to the client apparatus 102 at a frame rate that enables a minimum delay.

Although the time determination unit 303 does not determine the segment time for which the frame period exceeds the specified time, the segment time may be determined for such a frame period by using, for example, the methods (a) to (d) of the first exemplary embodiment. Also in this case, the time determination unit 303 may store the frame period and the segment time as information including the frame period and the segment time associated with each other in the primary storage device 202.

The data generation unit 305 may be configured to simultaneously generate video data of frame periods indicated by the frame period list 800, or may be configured to simultaneously generate only video frames of a single frame period in a sequence. In this case, after receiving the transmission request for a segment from the client apparatus 102, the reception unit 301 determines which Representation in the MPD file 1000 stored in the primary storage device 202 corresponds to the required segment. The data generation unit 305 may start generation of video frames of a frame period corresponding to the frame rate information about Representation determined by the reception unit 301.

The segment generation unit 306 starts segment generation when the time determination unit 303 determines the segment time, but may start segment generation in the segment time corresponding to the segment time information included in the Representation. In this case, after receiving the transmission request for a segment from the client apparatus 102, the reception unit 301 determines which Representation in the MPD file 1000 stored in the primary storage device 202 corresponds to the required segment. The segment generation unit 306 may start generation of a segment in the segment time corresponding to the segment time information included in the Representation determined by the reception unit 301.

The segment generation unit 306 may be configured to simultaneously generate segments of a plurality of segment times in a sequence, or the segment generation unit 306 may simultaneously generate only segments of a single segment time in a sequence. For example, in the latter case, after the reception unit 301 receives a transmission request for a segment from the client apparatus 102, the data generation unit 305 may start to generate a video frame of a frame period of Representation corresponding to the segment.

An information processing apparatus according to a third exemplary embodiment will be described below. The information processing apparatus according to the third exemplary embodiment is the client apparatus 102 illustrated in FIG. 1, and is an example in a case where the processing apparatus itself determines the segment time and transmits the segment time to the information generating apparatus 101 side. In the third exemplary embodiment, the information generating apparatus 101 in FIG. 1 does not perform the processing of determining the segment time as described in the above-described exemplary embodiments, but receives the information about the segment time determined and transmitted by the client apparatus 102. The information generating apparatus 101 then generates data of a segment corresponding to the segment time transmitted from the client apparatus 102, and transmits the data to the client apparatus 102.

FIG. 11 is a diagram illustrating a hardware configuration example of the client apparatus 102 according to the third exemplary embodiment.

The client apparatus 102 according to the third exemplary embodiment includes a CPU 1101, a primary storage device 1102, a secondary storage device 1103, an operation I/F 1105, an output I/F 1106, and a network I/F 1107, which are interconnected via an internal bus 1104. To the output I/F 1106 of the client apparatus 102, a reproduction apparatus 1110 such as a display device or an audio output device is connected.

The primary storage device 1102 is a writable high-speed storage device such as a RAM. Into the primary storage device 1102, an OS, various programs, and various types of data are loaded and the primary storage device 1102 is used as a work area of them. The secondary storage device 1103 is a nonvolatile storage device such as a flash memory, an HDD, or an SD card, and is used as a permanent storage area for an OS, various programs, and various types of data, and is also used as a short-term storage area for various types of data.

The CPU 1101 loads a program stored in the secondary storage device 1103 into the primary storage device 1102 and executes the program, thereby performing processing of the client apparatus 102 according to the third exemplary embodiment. The operation I/F 1105 is an interface for a user to input various instructions to the client apparatus 102 of the present exemplary embodiment. The network I/F 1107 is an interface connected to the information generating apparatus 101 via the network 103, and is responsible for communication with the information generating apparatus 101.

FIG. 12 is a diagram illustrating a functional configuration example of the client apparatus 102 according to the third exemplary embodiment.

The client apparatus 102 of the third exemplary embodiment includes a communication unit 1201, a period acquisition unit 1202, a time acquisition unit 1203, a time determination unit 1204, a segment processing unit 1205, and a reproduction processing unit 1206. The communication unit 1201 to the reproduction processing unit 1206 function when the CPU 1101 in FIG. 11 executes a program.

In the third exemplary embodiment, the period acquisition unit 1202 transmits an acquisition request command for information indicating a frame period, which is the minimum unit of media data generated by the information generating apparatus 101, to the information generating apparatus 101 via the communication unit 1201. It is preferable that a request for acquiring information indicating a frame period be transmitted prior to transmission of the playlist transmission request command. The period acquisition unit 1202 then acquires, via the communication unit 1201, information indicating the frame period transmitted from the information generating apparatus 101 as a response to the transmission request.

The time acquisition unit 1203 acquires information indicating a specified time for specifying a unit time of segments based on the display performance, processing capability, communication status, and the like of the client apparatus 102. In the third exemplary embodiment, the information about the specified time acquired by the time acquisition unit 1203 is similar to the specified time included in the unit time information acquired by the time acquisition unit 302 of the information generating apparatus 101 of the above-described exemplary embodiments. The specified time may be, for example, a time that can be expressed in the above-described time length format or frame number format.

The time determination unit 1204 determines at least one segment time, which is a candidate for a unit time of segments generated by the information generating apparatus 101, based on the information about the frame period and the specification information. In the third exemplary embodiment, the segment time determined by the time determination unit 1204 is similar to the segment time determined in the above-described first or second exemplary embodiment. The client apparatus 102 puts information indicating the determined segment time in, for example, a command of a playlist transmission request, and transmits the information to the information generating apparatus 101 via the communication unit 1201.

After transmission of the playlist transmission request command including the segment time described above, the client apparatus 102 receives, via the communication unit 1201, the segment data generated based on the segment time and transmitted by the information generating apparatus 101.

The segment processing unit 1205 decodes the data of the segment received by the communication unit 1201, combines the data of the decoded frames, and performs other processing to perform processing for restoring the media data.

The reproduction processing unit 1206 performs reproduction processing for generating video and audio data to be reproduced by the reproduction apparatus 1110 in FIG. 11 based on the media data restored by the segment processing unit 1205.

FIG. 13 is a flowchart illustrating a flow of the main processing in the client apparatus 102 according to the third exemplary embodiment. It is assumed that the processing illustrated in the flowchart of FIG. 13 is performed before transmission of, for example, a playlist transmission request to the information generating apparatus 101.

In step S1301, the period acquisition unit 1202 acquires information indicating the frame period transmitted from the information generating apparatus 101 as a response to the frame period acquisition request described above via the communication unit 1201.

In step S1302, the time acquisition unit 1203 acquires information about a specified time for specifying a unit time of segments based on the display performance, processing capability, communication status, and the like of the client apparatus 102.

In step S1303, the time determination unit 1204 determines at least one segment time, which is a candidate for a unit time of segments generated by the information generating apparatus 101, based on the information about the frame period and the specified time.

In step S1304, the communication unit 1201 transmits the information indicating the segment time determined in step S1303 included in, for example, the playlist transmission request command to the information generating apparatus 101. When the transmission of the playlist transmission request command including the segment time is completed, the client apparatus 102 waits for the playlist to be transmitted from the information generating apparatus 101.

Other Exemplary Embodiments

The client apparatus 102 can also set or change the frame period included in an MPD after acquiring the MPD, which is a playlist, from the information generating apparatus 101. In this case, when the frame period is changed or otherwise modified, the client apparatus 102 put the change or modification in, for example, a transmission request command for a media segment and returns the transmission request to the information generating apparatus 101 side. The information generating apparatus 101 then generates segment data corresponding to the changed frame period and transmits the data to the client apparatus 102.

Further, the information generating apparatus 101 may be configured to detect whether the segment time has been determined on the client apparatus 102 side as in the third exemplary embodiment. If the information generating apparatus 101 detects that the segment time has not been determined on the client apparatus 102 side, the information generating apparatus 101 itself may perform processing for determining a segment time. Whether the segment time has been determined on the client apparatus 102 side can be detected based on, for example, a force option, whether the value of the specified time transmitted from the client apparatus 102 is accurate with respect to the frame rate, or the like.

Furthermore, in the exemplary embodiments described above, Dynamic Adaptive Streaming over Hypertext Transfer Protocol (HTTP) (DASH) distribution has been described as an example, but the present disclosure is also applicable to other adaptive streaming techniques such as HTTP Live Streaming (HLS) distribution.

The present disclosure can also be realized by processing in which a program for realizing one or more functions of the above-described exemplary embodiments is supplied to a system or an apparatus via a network or a storage medium, and one or more processors in a computer of the system or the apparatus read and execute the program. The present disclosure can also be realized by a circuit (for example, application specific integrated circuit (ASIC)) which realizes one or more functions.

It should be noted that all of the exemplary embodiments described above are merely examples of embodiments to implement the present disclosure, and the technical scope of the present disclosure should not be interpreted in a limited manner. That is, the present disclosure may be implemented in a variety of ways without departing from the technical concept or main features thereof.

According to the above-described exemplary embodiments, segments can be reproduced without interruption while reducing the reproduction delay.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-145650, filed Aug. 2, 2018, which is hereby incorporated by reference herein in its entirety.

What is claimed is:

1. A video data transmission apparatus that divides video data including a plurality of frame images by a length of a predetermined segment time and transmits segment data generated by the division in units of the segment data, comprising:
a generation unit configured to generate periodically a frame image in a unit of a predetermined frame period;
a reception unit configured to receive a request for a playlist from an external apparatus, the request including specification information that specifies a length of a segment time;
a determination unit configured to determine the length of the predetermined segment time based on the predetermined frame period indicating an interval of time for generating the frame image and the specification information; and
a transmission unit configured to transmit the playlist containing information for acquiring the segment data generated by dividing the video data by the length of the segment time determined by the determination unit, to the external apparatus,
wherein the transmission unit transmits the segment data requested from the external apparatus using the information containing the playlist to the external apparatus,
wherein the determination unit determines the length of the predetermined segment time to be a time that is an integer multiple of the predetermined frame period and is closest to the length of the segment time specified by the specification information.

2. The video data transmission apparatus according to claim 1, wherein the determination unit determines the length of the predetermined segment time to be equal to an integer multiple of the predetermined frame period.

3. The video data transmission apparatus according to claim 1, wherein the determination unit determines the length of the predetermined segment time to be a time that is minimum among integer multiples of the predetermined frame period and that are equal to or more than the length of the segment time specified by the specification information.

4. The video data transmission apparatus according to claim 1, wherein the determination unit determines the length of the predetermined segment time to be a time that is maximum among integer multiples of the predetermined frame period and that are equal to or less than the length of the segment time specified by the specification information.

5. The video data transmission apparatus according to claim 1, wherein the playlist is a Media Presentation Description (MPD) file in the MPEG-DASH standard.

6. The video data transmission apparatus according to claim 5, wherein the MPD file includes a uniform resource identifier (URI) as the information for acquiring the segment data.

7. A video data transmitting method for dividing video data including a plurality of frame images by a length of a predetermined segment time and transmits segment data generated by the division in units of the segment data, comprising:
generating periodically a frame image in a unit of a predetermined frame period;
receiving a request for a playlist from an external apparatus, the request including specification information that specifies a length of a segment time;
determining the length of the predetermined segment time based on the predetermined frame period indicating an interval of time for generating the frame image and the specification information; and transmitting the playlist containing information for acquiring the segment data generated by dividing the video data by the length of the predetermined segment time determined by the determination to the external apparatus, wherein the segment data requested is transmitted from the external apparatus using the information containing the playlist to the external device, wherein the length of the predetermined segment time is determined to be a time that is an integer multiple of the predetermined frame period and is closest to the length of the segment time specified by the specification information.

8. A non-transitory storage medium that can be read by a computer of a video data transmission apparatus dividing video data including a plurality of frame images by a length of a predetermined segment time and transmits segment data generated by the division in units of the segment data and that stores a program causing the computer to function as:

a generation unit configured to generate periodically a frame image in a unit of a predetermined frame period;

a reception unit configured to receive a request for a playlist from an external apparatus, the request including specification information that specifies a length of a segment time;

a determination unit configured to determine the length of the predetermined segment time based on the predetermined frame period indicating an interval of time for generating the frame image and the specification information; and a transmission unit configured to transmit the playlist containing information for acquiring the segment data generated by dividing the video data by the length of the predetermined segment time determined by the determination unit to the external apparatus, wherein the transmitting unit transmits the segment data requested from the external apparatus using the information containing the playlist to the external device, wherein the determination unit determines the length of the predetermined segment time to be a time that is an integer multiple of the predetermined frame period and is closest to the length of the segment time specified by the specification information.

* * * * *